(12) United States Patent
Shih et al.

(10) Patent No.: US 9,250,648 B2
(45) Date of Patent: Feb. 2, 2016

(54) MEMORY EXPANSION ASSEMBLY

(71) Applicants: Inventec (Pudong) Technology Corporation, Shanghai (CN); INVENTEC CORPORATION, Taipei (TW)

(72) Inventors: Ming-Hung Shih, Taipei (TW); Hsin-Liang Chen, Taipei (TW); Yen-Cheng Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 384 days.

(21) Appl. No.: 13/844,904

(22) Filed: Mar. 16, 2013

(65) Prior Publication Data

US 2014/0139994 A1    May 22, 2014

(30) Foreign Application Priority Data

Nov. 16, 2012  (CN) .......................... 2012 1 0465146

(51) Int. Cl.
*G06F 1/16* (2006.01)
*G06F 1/18* (2006.01)

(52) U.S. Cl.
CPC . *G06F 1/16* (2013.01); *G06F 1/185* (2013.01)

(58) Field of Classification Search
CPC ............. G06F 1/18; G06F 1/16; G06F 1/185; G06F 1/183

USPC .............. 361/679.31, 679.325, 804, 803, 801
See application file for complete search history.

(56) References Cited

U.S. PATENT DOCUMENTS

| | | | |
|---|---|---|---|
| 6,202,110 B1 * | 3/2001 | Coteus | G06F 13/409 361/679.32 |
| 6,297,957 B1 * | 10/2001 | Johnson et al. | 361/679.46 |
| 6,934,152 B1 * | 8/2005 | Barrow | 361/690 |
| 7,385,809 B2 * | 6/2008 | Graffius | 361/679.55 |
| 8,537,563 B2 * | 9/2013 | Purcell et al. | 361/802 |
| 2008/0266777 A1 * | 10/2008 | Goldstein | H05K 7/1431 361/679.32 |

* cited by examiner

*Primary Examiner* — Dion R Ferguson
*Assistant Examiner* — Mandeep S Buttar
(74) *Attorney, Agent, or Firm* — Locke Lord LLP; Tim Tingkang Xia, Esq.

(57) ABSTRACT

A memory expansion assembly includes a first plate having first electrical slots and a first electrically connecting portion, a second plate pivotally connected to the first plate and having second electrical slots and a second electrically connecting portion, a first engaging assembly, and a second engaging assembly. The first electrical slots are electrically connected to the first electrically connecting portion. The second electrical slots are electrically connected to the second electrically connecting portion. The second plate is adapted to pivot relative to the first plate to have a folded position when the two are close to each other and an unfolded position when the two are away from each other. The first engaging assembly is disposed on a side of the first plate. The second engaging assembly is disposed on a side of the second plate. The first engaging assembly is removably engaged with the second engaging assembly.

8 Claims, 12 Drawing Sheets

MEMORY EXPANSION ASSEMBLY

CROSS-REFERENCE TO RELATED APPLICATIONS

This non-provisional application claims priority under 35 U.S.C. §119(a) on Patent Application No(s). 201210465146.4 filed in China on Nov. 16, 2012, the entire contents of which are hereby incorporated by reference.

BACKGROUND OF THE INVENTION

1. Field of the Invention

The disclosure relates to an expansion assembly, and more particularly to a memory expansion assembly.

2. Description of the Related Art

A Central Processing Unit (CPU) of a computer uses a Random Access Memory (RAM) as a data storage area. The CPU stores all calculation results and program instructions in the RAM. When required by execution of a program, data stored in the storage area can be accessed.

However, functions of the computer become more and more powerful, and requirements on data processing speed and the amount of data increase correspondingly. Therefore, a user usually expects the number of memory slots to be increased to expand capacity of the memory. However, the increase of the number of memory slots inevitably increases the area of a motherboard, which increases the volume of the computer, thereby affecting the computer being compact. Furthermore, if the number of memory slots is increased without increasing the area of the motherboard, spaces arranged for other electronic components are occupied.

Therefore, how to increase the number of memory slots in a limited space of the motherboard to increase the capacity of the memory and therefore improve computing performance of the computer is a problem needs to be solved.

BRIEF SUMMARY OF INVENTION

A memory expansion assembly according to an embodiment of the disclosure comprises a first plate, a second plate, a first engaging assembly, and a second engaging assembly. The first plate has a plurality of first electrical slots and a first electrically connecting portion. The plurality of first electrical slots are electrically connected to the first electrically connecting portion. The second plate is pivotally connected to the first plate. The second plate has a plurality of second electrical slots and a second electrically connecting portion. The plurality of second electrical slots are electrically connected to the second electrically connecting portion. The second plate is adapted to pivot relative to the first plate, so as to have in a folded position when the first plate and the second plate are close to each other and have an unfolded position when the first plate and the second plate are away from each other. The first engaging assembly is disposed on a side of the first plate. The second engaging assembly is disposed on a side of the second plate. The first engaging assembly is removably engaged with the second engaging assembly. When the second plate is in the folded position, the first electrically connecting portion and the second electrically connecting portion are located on the same side of the memory expansion assembly. When the second plate is in the unfolded position, the memories are inserted into the plurality of first electrical slots and the plurality of second electrical slots.

BRIEF DESCRIPTION OF THE DRAWINGS

The disclosure will become more fully understood from the detailed description given herein below for illustration only, and thus does not limit the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1A:
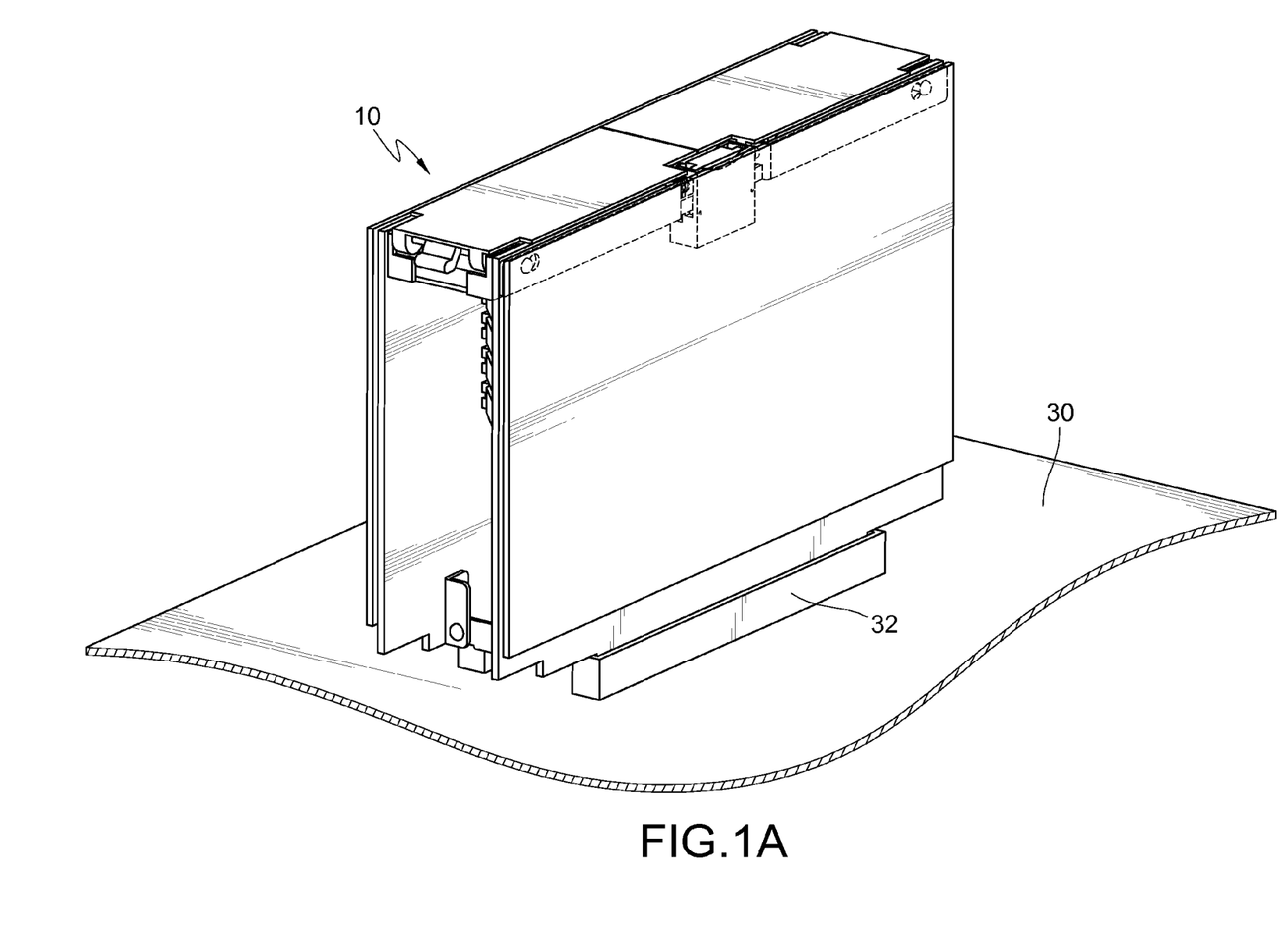
FIG. 1A is a schematic perspective view of a memory expansion assembly inserted into a plurality of expansion slots of a motherboard according to an embodiment of the disclosure.
Figure 1B:
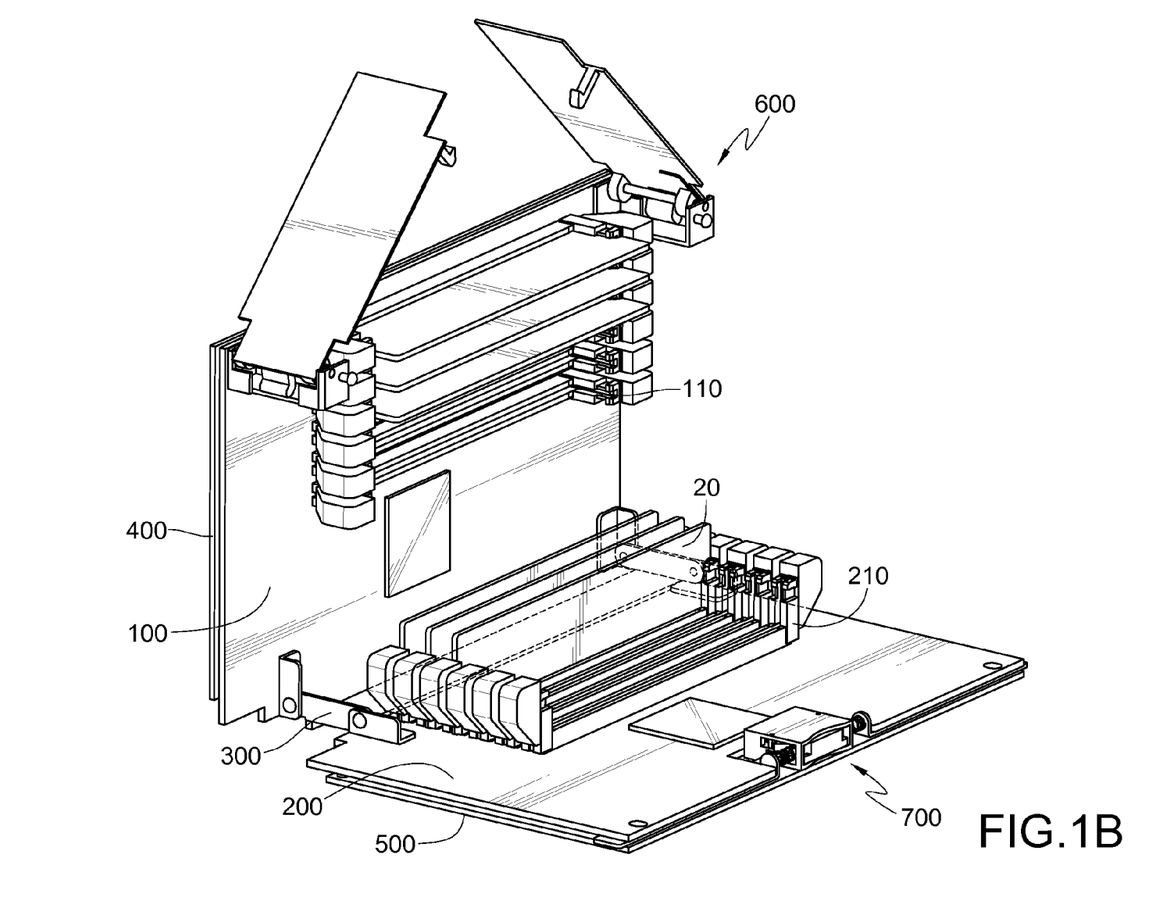
FIG. 1B is a schematic view of the memory expansion assembly in FIG. 1A when being unfolded.
Figure 2A:
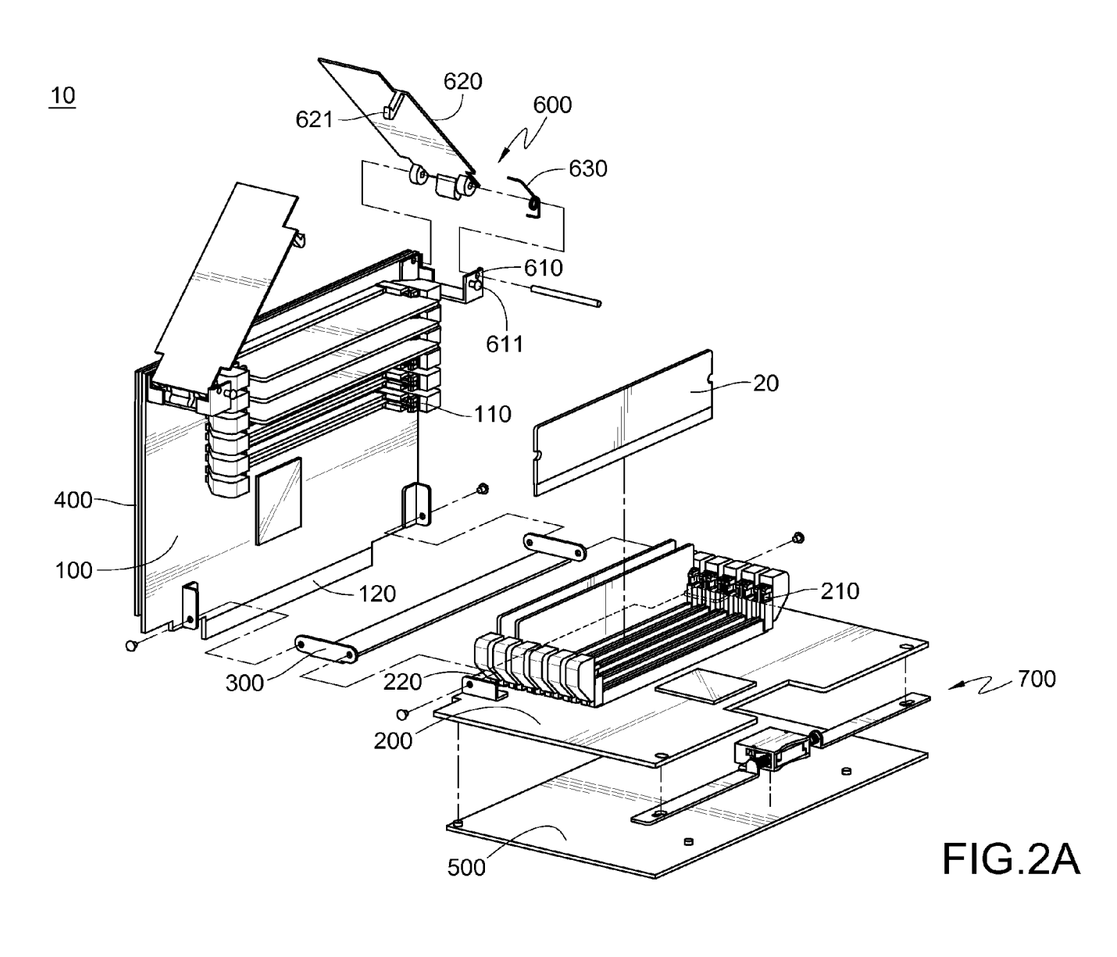
FIG. 2A is a schematic exploded view of the memory expansion assembly in FIG. 1A.
Figure 2B:
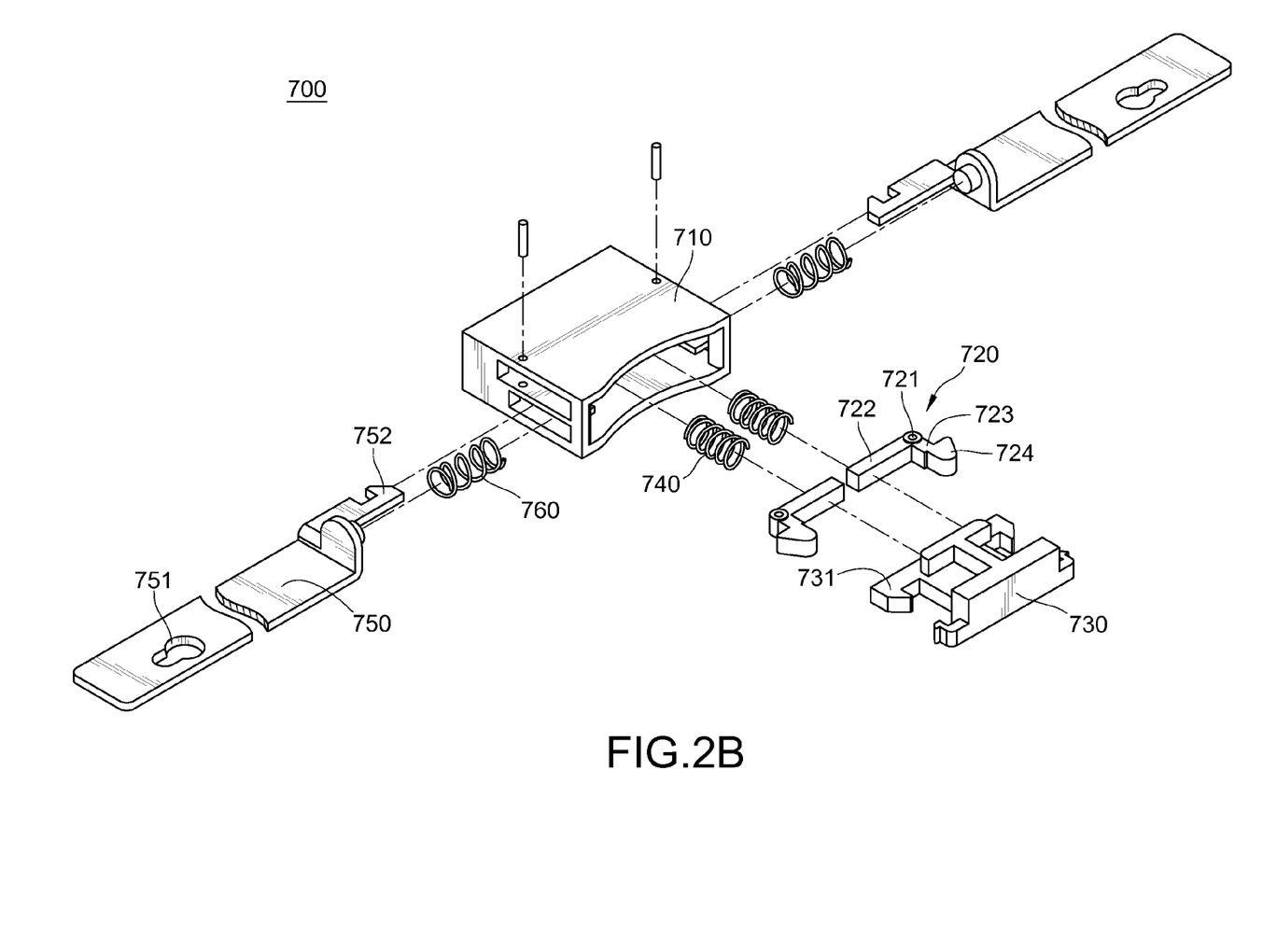
FIG. 2B is a schematic exploded view of a second engaging assembly in FIG. 2A.

Referring to FIGS. 1A to 2B, FIG. 1A is a schematic perspective view of a memory expansion assembly inserted into a plurality of expansion slots of a motherboard according to an embodiment of the disclosure, FIG. 1B is a schematic view of the memory expansion assembly in FIG. 1A when being unfolded; FIG. 2A is a schematic exploded view of the memory expansion assembly in FIG. 1A, and FIG. 2B is a schematic exploded view of a second engaging assembly in FIG. 2A.

A memory expansion assembly 10 according to this embodiment is adapted to insert a plurality of memories 20. The memory expansion assembly 10 comprises a first plate 100, a second plate 200, a first engaging assembly 600, and a second engaging assembly 700. The memory expansion assembly 10 further comprises a pivotally connecting member 300. The first plate 100 has a plurality of first electrical slots 110 and a first electrically connecting portion 120. The plurality of first electrical slots 110 are respectively electrically connected to the first electrically connecting portion 120. The second plate 200 is pivotally connected to the first plate 100 by the pivotally connecting member 300. Typically, both two opposite sides of the pivotally connecting member 300 are pivotally connected to the first plate 100 and the second plate 200 respectively, so that the second plate 200 can pivot relative to the first plate 100, thereby having a folded position when the first plate 100 and the second plate 200 are close to each other or an unfolded position when the first plate 100 and the second plate 200 are away from each other. A distance is kept between the first plate 100 and the second plate 200 by the pivotally connecting member 300. The second plate 200 has a plurality of second electrical slots 210 and a second electrically connecting portion 220. The plurality of second electrical slots 210 are respectively electrically connected to the second electrically connecting portion 220. Furthermore, the number of the plurality of first electrical slots 110 and the number of the plurality of second electrical slots 210 in this embodiment are respectively, for example, 5, but the disclosure is not limited thereto. In some other embodiments, the number of the plurality of first electrical slots 110 and the number of the plurality of second electrical slots 210 are respectively 5, greater than 5, or less than 5.

When the second plate 200 is in the folded position, the first electrically connecting portion 120 and the second electrically connecting portion 220 are located on the same side of the memory expansion assembly 10, so that the first electrically connecting portion 120 and the second electrically connecting portion 220 can be inserted into two expansion slots 32 of a motherboard 30 respectively. Furthermore, in this embodiment, the plurality of first electrical slots 110 and the plurality of second electrical slots 210 are located between the first plate 100 and the second plate 200. Typically, the distance between the first plate 100 and the second plate 200 is between the height of the memories 20 and twice the height of the memories 20, the plurality of first electrical slots 110 face the second plate 200, and the plurality of second electrical slots 210 face the first plate 100, so that the plurality of first electrical slots 110 and the plurality of second electrical slots 210 are arranged alternately side by side, but the disclosure is not limited thereto. In some other embodiments, the first plate 100 and the second plate 200 are located between the plurality of first electrical slots 110 and the plurality of second electrical slots 210.

When the second plate 200 is in the unfolded position, a user can insert the memories 20 into the plurality of first electrical slots 110 and the plurality of second electrical slots 210 respectively, so as to increase the amount of the memories 20 inserted into the plurality of expansion slots 32.

In this and some other embodiments, the memory expansion assembly 10 further comprises a first plate body 400 and a second plate body 500. The first plate body 400 is mounted on the first plate 100. The second plate body 500 is mounted on the second plate 200. When the second plate 200 is in the folded position, the first plate 100 and the second plate 200 are located between the first plate body 400 and the second plate body 500. The first engaging assembly 600 is mounted on the first plate body 400. The second engaging assembly 700 is mounted on the second plate body 500. The first engaging assembly 600 is removably engaged with the second engaging assembly 700, so as to fix the second plate 200 in the folded position.

Typically, the first engaging assembly 600 comprises two pivotally connecting seats 610 and two engaging pieces 620. The two pivotally connecting seats 610 are mounted on two opposite corners of the first plate body 400 respectively. The two engaging pieces 620 are pivotally connected to the two pivotally connecting seats 610 respectively. Each of the two engaging pieces 620 has a first hook portion 621. For each of the engaging pieces 620, the first hook portion 621 is located on a side away from the pivotally connecting seat 610, so that the two first hook portions 621 are respectively located in a middle section of the first plate body 400. The second engaging assembly 700 comprises a seat body 710 and two first fasteners 720. The seat body 710 is disposed in a middle section of the second plate body 500. The two first fasteners 720 are disposed at the seat body 710, and each of the two first fasteners 720 has a second hook portion 724. The two second hook portions 724 are located on two opposite sides of the seat body 710 respectively, and protrude from surfaces of the two sides of the seat body 710. The two first hook portions 621 are removably engaged with the two second hook portions 724 respectively. Furthermore, in this and some other embodiments, a third elastic member 630 is mounted between each of the pivotally connecting seats 610 and the corresponding engaging piece 620, and the third elastic members 630 are pressed against the pivotally connecting seats 610 and the engaging pieces 620 respectively, so that normally the two engaging pieces 620 are separated from each other.

In addition to that the engaging pieces 620 are adapted to be engaged with the first fasteners 720 of the second engaging assembly 700 to make the first plate 100 and the second plate 200 to be fixed in the folded position, the engaging pieces 620 may be held by the user, so that the user can insert the memory expansion assembly 10 into the plurality of expansion slots 32.

In this and some other embodiments, the second engaging assembly 700 further comprises a pressing member 730 and at least one first elastic member 740. The pressing member 730 is slidably disposed at the seat body 710. The first elastic member 740 is disposed at the seat body 710, and is located between the seat body 710 and the pressing member 730. Each of the two first fasteners 720 has a pivotally connecting portion 721, a first cantilever 722, and a second cantilever 723. The first cantilever 722 and the second cantilever 723 extend from the pivotally connecting portion 721 in different directions respectively. The two pivotally connecting portions 721 are pivotally disposed on two opposite sides of the seat body 710 respectively. The two first cantilevers 722 are both located between the two pivotally connecting portions 721. The two second hook portions 724 are located at the two second cantilevers 723 respectively. The two first cantilevers 722 are both located between the first elastic member 740 and the pressing member 730, and are pressed against the first elastic member 740 and the pressing member 730 respectively. The two first fasteners 720 are adapted to pivot relative to the seat body 710, thereby having a first engaging position when the two second hook portions 724 protrude from the side surfaces of the seat body 710 or having a first release position when the two second hook portions 724 retract into the seat body 710. The two first cantilevers 722 normally are pressed by the first elastic member 740, so as to be located in the first engaging position. The pressing member 730 can move towards the first elastic member 740 to drive the two first fasteners 720 to move from the first engaging position to the first release position, to break an engagement relationship between the first hook portions 621 and the second hook portions 724, so as to enable the second plate 200 to be adapted to move from the folded position to the unfolded position.

In this and some other embodiments, the pressing member 730 further comprises two third hook portions 731. The two third hook portions 731 are pressed against the first elastic member 740 respectively. The first engaging assembly 600 further comprises two engaging columns 611. The two engaging columns 611 are located at surfaces of the two pivotally connecting seats 610 away from the first plate 100, respectively. The second engaging assembly 700 further comprises two second fasteners 750 and two second elastic members 760. The two second fasteners 750 are slidably disposed at the second plate body 500 respectively, and the two second fasteners 750 are located between the second plate 200 and the second plate body 500. Both of two opposite ends of each of the two second fasteners 750 have an engaging hole 751 and a fourth hook portion 752. For each of the second fasteners 750, the fourth hook portion 752 is closer to the pressing member 730 than the engaging hole 751. The two second elastic members 760 are pressed against the two second fasteners 750 and the seat body 710 respectively. Each of the two second fasteners 750 has a second engaging position when the second fastener 750 is close to the pressing member 730 and a second release position when the second fastener 750 is away from the pressing member 730. When the two second fasteners 750 are located in the second engaging positions, the two second elastic members 760 are pressed by the seat body 710 and the two second fasteners 750 respectively, and the two fourth hook portions 752 are engaged with the two third hook portions 731 respectively. The two engaging columns 611 are engaged with the two engaging holes 751 respectively. When the pressing member 730 is moved towards the first elastic member 740, the two fourth hook portions 752 are separated from the two third hook portions 731 respectively, and the two second elastic members 760 are adapted to push the two second fasteners 750 from the second engaging positions to the second release positions respectively, so that the two engaging holes 751 are separated from the two engaging columns 611.

In this embodiment, the pressing member 730 makes the two second hook portions 724 to be separated from the two first hook portions 621 as well as making the two third hook portions 731 to be separated from the two fourth hook portions 752 at the same time, but the disclosure is not limited thereto. In some other embodiments, two pressing members 730 are adapted to control the movements of the second hook portions 724 and the third hook portions 731 respectively.

Figure 3A:
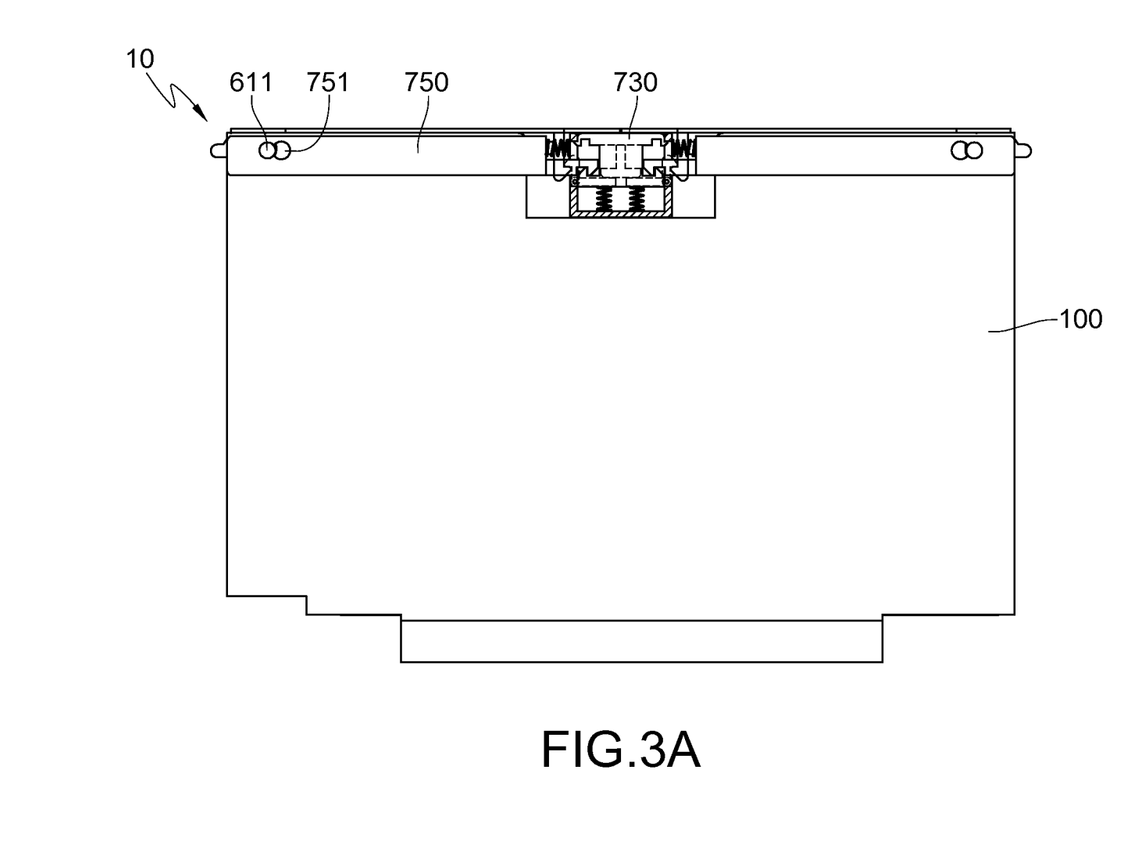
FIGS. 3A to 3H are schematic operation views of FIG. 1.
Figure 3B:
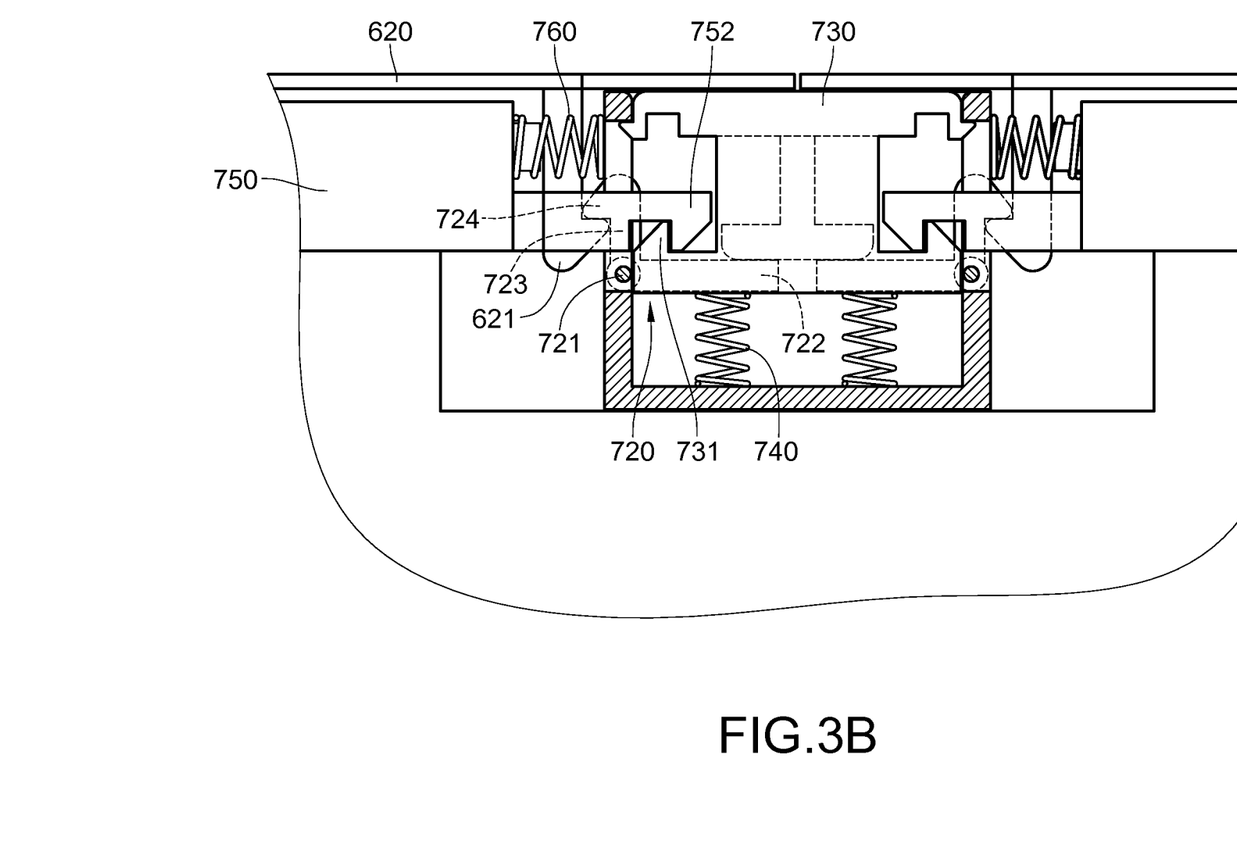

Referring to FIGS. 3A to 3H, FIGS. 3A to 3H are schematic operation views of FIG. 1. As shown in FIGS. 3A and 3B, the second plate 200 is located in the folded position, the second plate 200 is close to the first plate 100 correspondingly, and the two first fasteners 720 are pressed by the two first elastic members 740 respectively to be located in the first engaging positions, so that the two first hook portions 621 are engaged with the two second hook portions 724 respectively. Furthermore, the two second fasteners 750 are close to each other correspondingly and located in the second engaging positions, so that the two third hook portions 731 are engaged with the two fourth hook portions 752 respectively, and the two second elastic members 760 are pressed by the plurality of second fasteners 750 and the seat body 710 respectively to be in an elastically compressed state.

Figure 3C:
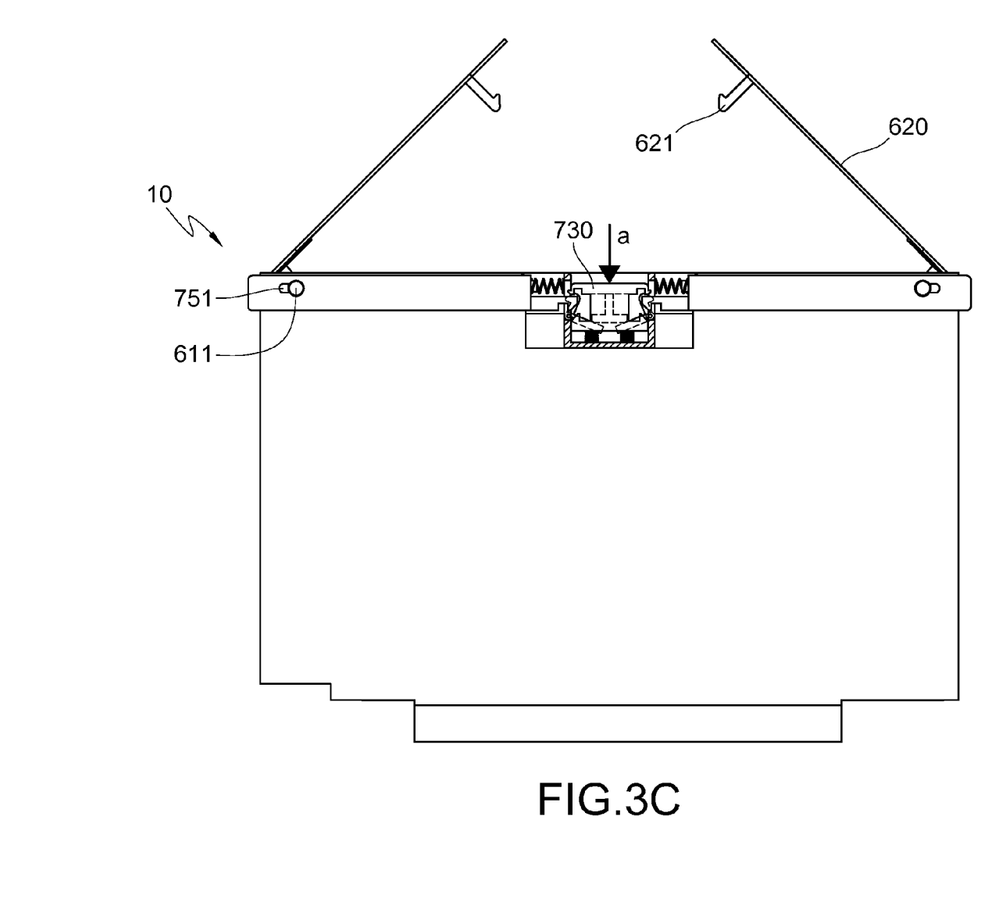
Figure 3D:
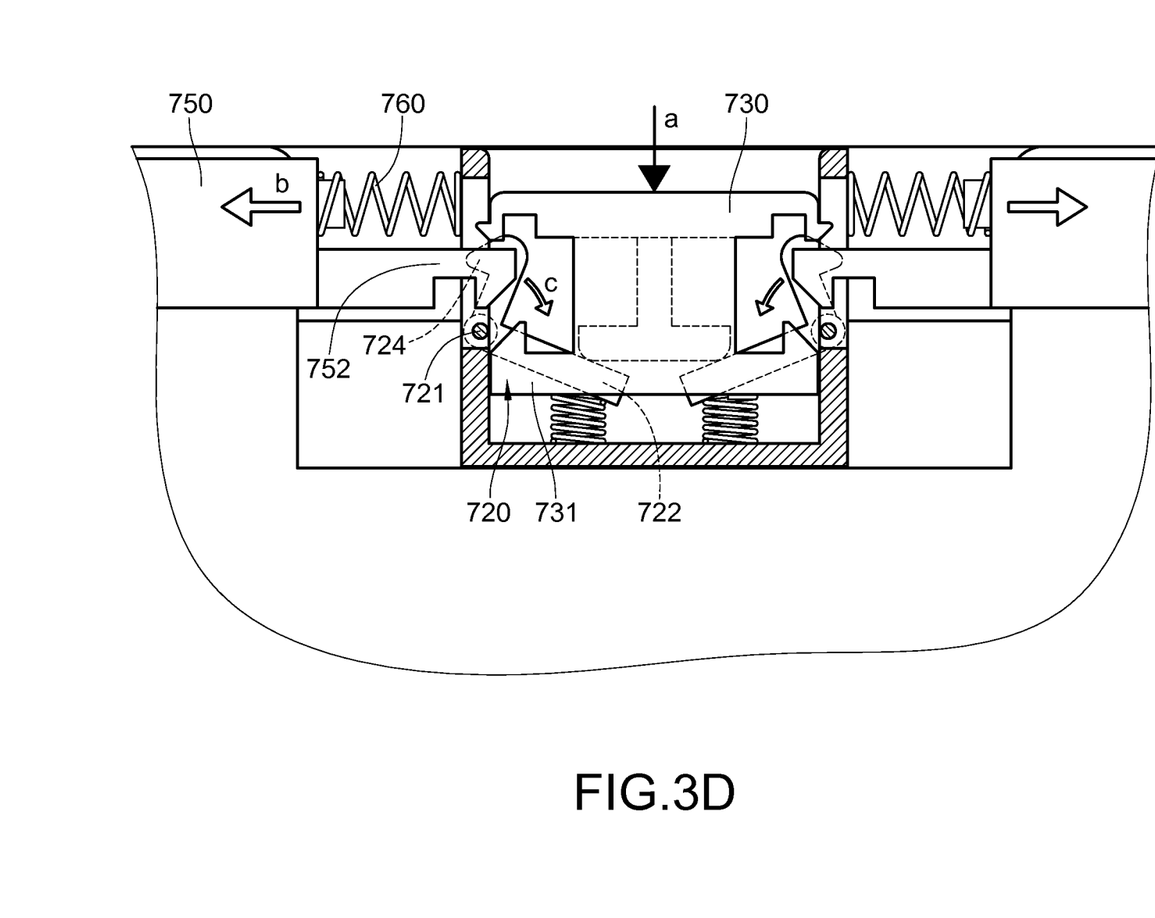

As shown in FIGS. 3C and 3D, in order to mount the memories 20 in the memory expansion assembly 10, the user has to open the memory expansion assembly 10. First, the pressing member 730 presses the plurality of second cantilevers 723 of the plurality of first fasteners 720 in a direction to the first elastic member 740 (along a direction indicated by an arrow a), so that the plurality of first fasteners 720 are pivoted relative to the seat body 710 (along directions indicated by arrows c) to be located in the first release positions, so as to break the engagement relationship between the plurality of second hook portions 724 of the plurality of first fasteners 720 and plurality of the first hook portions 621 of the plurality of engaging pieces 620. Furthermore, when the pressing member 730 is pressed towards the direction to the first elastic member 740, the plurality of third hook portions 731 are moved in the direction towards the first elastic member 740, so as to break the engagement relationship between the plurality of third hook portions 731 and the plurality of fourth hook portions 752. The plurality of second fasteners 750 are pressed by the plurality of second elastic members 760, and therefore move to the plurality of second release positions, so as to break the engagement relationship between the plurality of engaging holes 751 and the plurality of engaging columns 611.

Figure 3E:
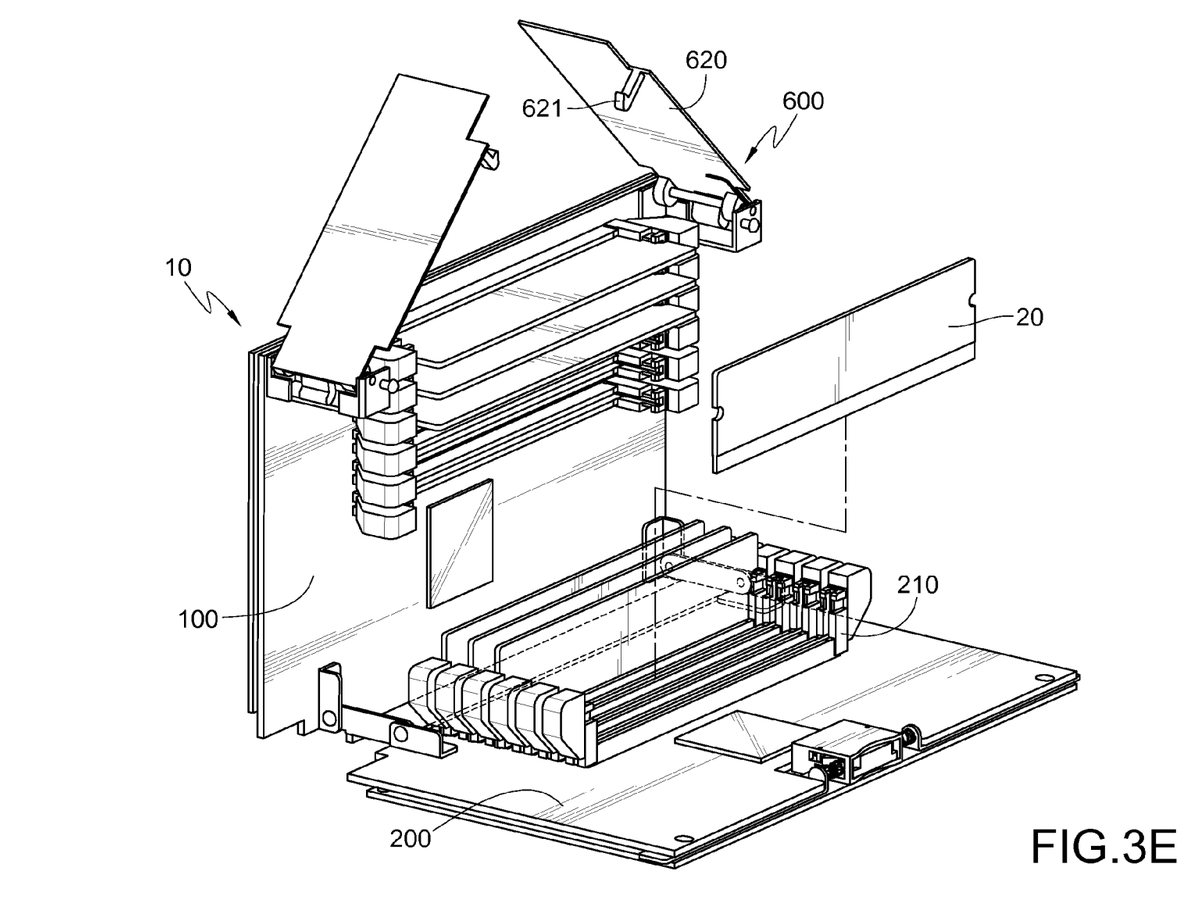

As shown in FIG. 3E, when the second plate 200 is located in the unfolded position, the user can insert the plurality of memories 20 into the plurality of first electrical slots 110 or the plurality of second electrical slots 210, so as to expand the capacity of the plurality of memories of the memory expansion assembly 10.

Figure 3F:
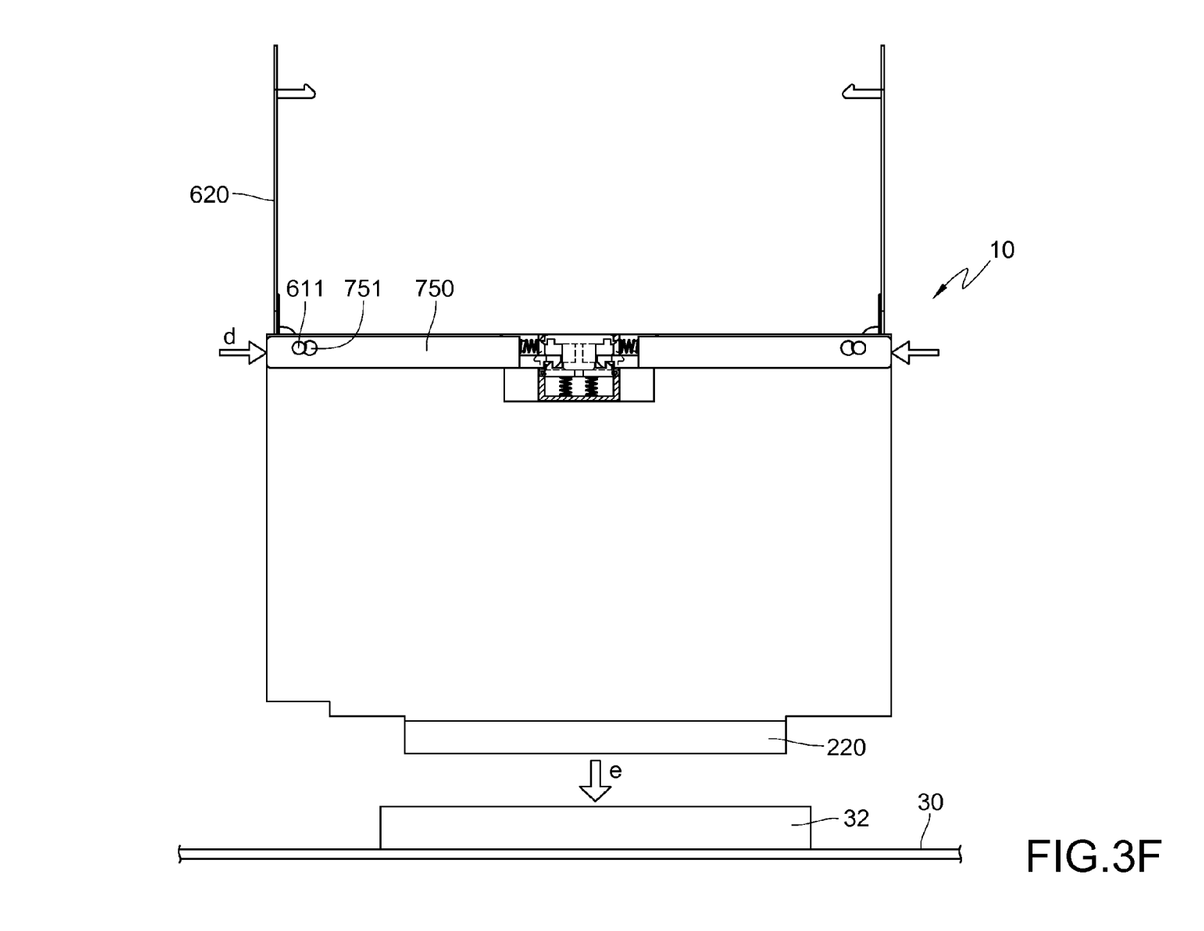

As shown in FIG. 3F, after the capacity of the memories of the memory expansion assembly 10, the first plate 100 and the second plate 200 are made to be close to each other to be located in the folded position, and the two second fasteners 750 are pressed inwards (along directions indicated by arrows d) respectively, so that the first plate 100 and the second plate 200 are fixed in the folded position. Therefore, when mounting the memory expansion assembly 10, the user can hold the engaging pieces 620 to insert the first electrically connecting portion 120 and the second electrically connecting portion 220 of the memory expansion assembly 10 into the two expansion slots 32.

Figure 3G:
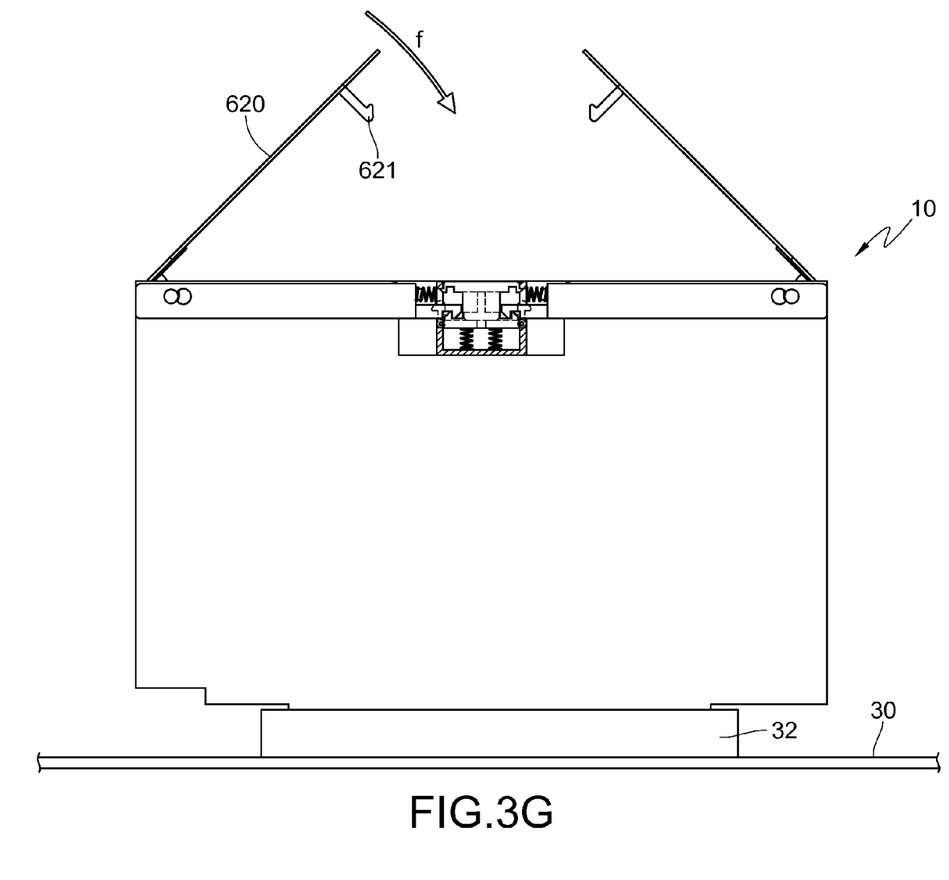
Figure 3H:
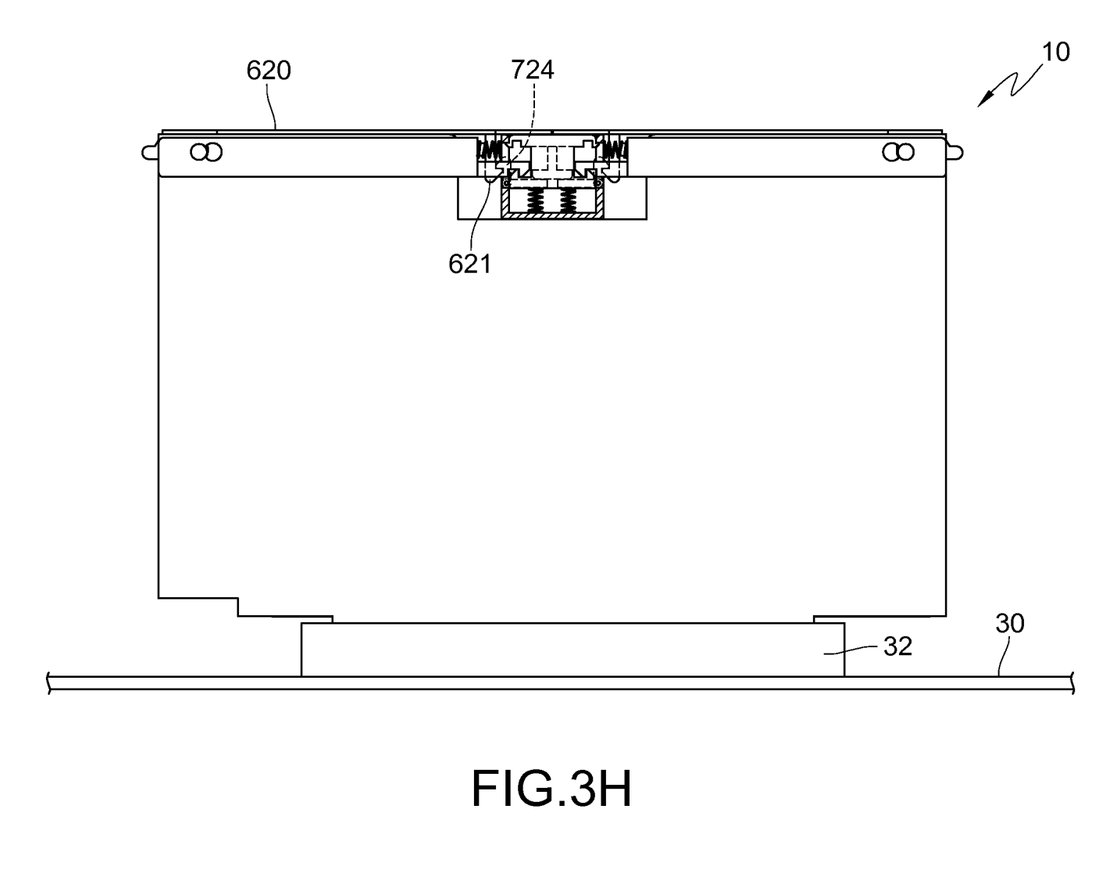

As shown in FIGS. 3G and 3H, finally the two engaging pieces 620 are folded (along a direction indicated by an arrow f), thereby completing the assembly process of the memory expansion assembly 10.

According to the memory expansion assembly disclosed by the disclosure, each of the first plate and the second plate comprises a plurality of electrical slots to which memories can be inserted, and the first plate and the second plate are pivotally connected to each other, so that when the memory expansion assembly is inserted into the plurality of expansion slots, the first plate and the second plate are erected on the motherboard respectively, and the memories are inserted into the plurality of electrical slots above the motherboard respectively. Therefore, in the limited space on the motherboard, the number of the plurality of electrical slots to which the plurality of memories can be inserted is increased, thereby increasing the capacity of the memories capable of being inserted into the computer.

Moreover, the pressing member may break the engagement relationship between the plurality of first hook portions and the plurality of second hook portions as well as the engagement relationship between the plurality of third hook portions and the plurality of fourth hook portions at the same time, so that in order to expand the amount of the plurality of memories, the user is only required to press down the pressing member, which makes the first plate and the second plate to be located in the unfolded position for inserting the plurality of memories, thereby improving ease of use of the memory expansion assembly.

What is claimed is:

1. A memory expansion assembly, for inserting a plurality of memories, the memory expansion assembly comprising:
    a first plate having a plurality of first electrical slots and a first electrically connecting portion, the plurality of first electrical slots being electrically connected to the first electrically connecting portion respectively;
    a second plate pivotally connected to the first plate, the second plate having a plurality of second electrical slots and a second electrically connecting portion, the plurality of second electrical slots being electrically connected to the second electrically connecting portion respectively, and the second plate being adapted to pivot relative to the first plate, so as to have a folded position when the first plate and the second plate are close to each other and have an unfolded position when the first plate and the second plate are away from each other;
    a first engaging assembly disposed on a side of the first plate;
    a second engaging assembly disposed on a side of the second plate, the first engaging assembly being removably engaged with the second engaging assembly;
    a first plate body mounted on the first plate; and
    a second plate body mounted on the second plate;
    wherein the first plate and the second plate are located between the first plate body and the second plate body, the first engaging assembly is mounted on the first plate body, the second engaging assembly is mounted on the second plate body, and the first engaging assembly is removably engaged with the second engaging assembly; and
    wherein when the second plate is in the folded position, the first engaging assembly is engaged with the second engaging assembly, and the first electrically connecting portion and the second electrically connecting portion are on the same side of the memory expansion assembly; when the second plate is in the unfolded position, the memories are capable of being inserted into the plurality of first electrical slots and the plurality of second electrical slots.

2. The memory expansion assembly according to claim 1, wherein when the second plate is located in the folded position, the plurality of first electrical slots and the plurality of second electrical slots are located between the first plate and the second plate.

3. The memory expansion assembly according to claim 2, wherein when the second plate is located in the folded position, the plurality of first electrical slots face the second plate, the plurality of second electrical slots face the first plate, and the plurality of first electrical slots and the plurality of second electrical slots are arranged side by side.

4. The memory expansion assembly according to claim 3, wherein a distance between the first plate and the second plate is between the height of the memory and twice the height of the memory.

5. The memory expansion assembly according to claim 1, further comprising a pivotally connecting member, wherein both two opposite sides of the pivotally connecting member are pivotally connected to the first plate and the second plate respectively, so that the second plate is capable of pivoting relative to the first plate.

6. The memory expansion assembly according to claim 1, wherein the first engaging assembly comprises two pivotally connecting seats and two engaging pieces, the two pivotally connecting seats are mounted on two opposite corners of the first plate body respectively, the two engaging pieces are pivotally connected to the two pivotally connecting seats respectively, each of the two engaging pieces has a first hook portion, the two first hook portions are located in a middle section of the first plate body, the second engaging assembly comprises a seat body and two first fasteners, the seat body is disposed in a middle section of the second plate body, the two first fasteners are disposed at the seat body, each of the two first fasteners has a second hook portion, the two second hook portions are located on two opposite sides of the seat body respectively, and the two first hook portions are removably engaged with the two second hook portions respectively.

7. The memory expansion assembly according to claim 6, wherein the second engaging assembly further comprises a pressing member and at least one first elastic member, the pressing member is slidably disposed at the seat body, the first elastic member is disposed at the seat body and located between the seat body and the pressing member, each of the two first fasteners has a pivotally connecting portion, a first cantilever and a second cantilever, the first cantilever and the second cantilever extend from the pivotally connecting portion in different directions respectively, the two pivotally connecting portions are pivotally disposed on two opposite sides of the seat body respectively, the two first cantilevers are both located between the two pivotally connecting portions, the two second hook portions are located at the two second cantilevers respectively, the two first cantilevers are both located between the first elastic member and the pressing member and are pressed against the first elastic member and the pressing member respectively, the two first fasteners are capable of pivoting relative to the seat body to have a first engaging position when the two second hook portions protrude from side surfaces of the seat body or a first release position when the two second hook portions retract into the seat body, the two first cantilevers are normally pressed by the first elastic member to be located in the first engaging position, and the pressing member is capable of moving towards the first elastic member, so as to drive the two first fasteners to move from the first engaging position to the first release position.

8. The memory expansion assembly according to claim 7, wherein the pressing member further comprises two third hook portions, the two third hook portions are pressed against the first elastic member respectively, the first engaging assembly further comprises two engaging columns, the two engaging columns are located on surfaces of the two pivotally connecting seats away from the first plate respectively, the second engaging assembly further comprises two second fasteners and two second elastic members, the two second fasteners are slidably disposed on the second plate body respectively, the two second fasteners are between the second plate and the second plate body, each of two opposite ends of the two second fasteners has an engaging hole and a fourth hook portion, the fourth hook portion of each of the second fasteners is closer to the pressing member than the engaging hole of the same second fastener, the two second elastic members are pressed against the two second fasteners and the seat body respectively, each of the two second fasteners has a second engaging position when the two second fasteners are close to each other and a second release position when the two second fasteners are away from each other; when the two second fasteners are located in the second engaging positions, both the two second elastic members are pressed by the seat body and the two second fasteners respectively, the two fourth hook portions are engaged with the two third hook portions respectively, and the two engaging columns are engaged with the two engaging holes respectively; when the pressing member is moved towards the first elastic member, the two fourth hook portions are separated from the two third hook portions respectively, and the two second elastic members are adapted to push the two second fasteners from the second engaging positions to the second release positions respectively, so as to separate the two engaging holes from the two engaging columns.

* * * * *